(12) United States Patent
Ashok et al.

(10) Patent No.: US 7,373,516 B2
(45) Date of Patent: May 13, 2008

(54) SYSTEMS AND METHODS OF SECURING RESOURCES THROUGH PASSWORDS

(75) Inventors: Guru S. Ashok, South Burlington, VT (US); Raymond P. Dunki-Jacobs, Williston, VT (US); Robert J. Milne, Jericho, VT (US); Rahul Nahar, South Burlington, VT (US); Ashit M. Shah, Essex Junction, VT (US); Shreesh S. Tandel, South Burlington, VT (US); Muthuswamy Venkatachalam, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 10/711,044

(22) Filed: Aug. 19, 2004

(65) Prior Publication Data

US 2006/0041756 A1    Feb. 23, 2006

(51) Int. Cl.
*H04L 9/00* (2006.01)
(52) U.S. Cl. .................. 713/183; 713/184; 713/185
(58) Field of Classification Search ............. 713/183
See application file for complete search history.

(56) References Cited

U.S. PATENT DOCUMENTS

| 5,375,244 A | 12/1994 | McNair |
| 5,430,827 A * | 7/1995 | Rissanen .................... 704/272 |
| 5,475,755 A * | 12/1995 | Matsumoto ................. 713/183 |
| 5,581,700 A | 12/1996 | Witte |
| 5,682,475 A | 10/1997 | Johnson et al. |
| 5,699,514 A | 12/1997 | Durinovis-Johri et al. |
| 5,793,951 A | 8/1998 | Stein et al. |
| 5,931,948 A | 8/1999 | Morisawa et al. |

(Continued)

FOREIGN PATENT DOCUMENTS

JP    2002-055958    2/2002

OTHER PUBLICATIONS

IBM Technical Disclosure Bulletin, "Key Manager for Multiple Distributed Computing Environment Servers", Sep. 1995, pp. 337-340.

(Continued)

*Primary Examiner*—Benjamin E. Lanier
(74) *Attorney, Agent, or Firm*—Gibb & Rahman, LLC; Richard M. Kotulak, Esq.

(57) ABSTRACT

Disclosed is a method of authorizing access to an item that maintains a lockout count and blocks access to the item if the lockout count exceeds a predetermined value. One feature is that the invention "variably" increments the lockout count if the presented password fails to exactly match the stored password. In this process the invention increments the lockout count different amounts depending upon how closely the presented password matches the stored password. The invention also provides a methodology that allocates a plurality of the same passwords to a plurality of users who share the same userid. The invention allows continuous operation of the item being accessed by providing that each of the passwords has a different expiration date. Also, when dealing with situations where a plurality of users who share the same userid also share the same password, the invention maps information associated with the users to the password in a data file and periodically updates the data file.

21 Claims, 14 Drawing Sheets

U.S. PATENT DOCUMENTS

| | | |
|---|---|---|
| 5,944,825 A | 8/1999 | Bellemore et al. |
| 6,202,158 B1 | 3/2001 | Urano et al. |
| 6,240,184 B1 | 5/2001 | Huynh et al. |
| 6,260,187 B1 | 7/2001 | Cirne |
| 6,276,604 B1 * | 8/2001 | Proidl .................. 235/382 |
| 6,397,337 B1 * | 5/2002 | Garrett et al. ............. 726/19 |
| 6,601,173 B1 | 7/2003 | Mohler |
| 7,139,917 B2 * | 11/2006 | Jablon ..................... 713/183 |
| 7,260,724 B1 * | 8/2007 | Dickinson et al. ......... 713/182 |
| 7,302,581 B2 * | 11/2007 | Utsumi et al. ............. 713/183 |
| 2002/0067832 A1 | 6/2002 | Jablon |
| 2002/0108046 A1 * | 8/2002 | Armingaud ............... 713/183 |
| 2003/0149900 A1 | 8/2003 | Glassman et al. |

OTHER PUBLICATIONS

IBM Technical Disclosure Bulletin, "Visual Password Expiration", Dec. 1992, 1 page.

IBM Technical Disclosure Bulletin, "Logon, Security, and Accounting Enhancements in Computing Systems", Jun. 1989, pp. 345-346.

* cited by examiner

| userid | userid-host name | userid-password | userid-expiry | userid-owner | userid-expiry-leadtime | userid-invalid-count | application | application-host | application-owner | application-rule |
|--------|------------------|-----------------|---------------|--------------|------------------------|----------------------|-------------|------------------|-------------------|------------------|
|        |                  |                 |               |              |                        |                      |             |                  |                   |                  |

Centralized Password Management Table (CPMT)

Fig. 13

SYSTEMS AND METHODS OF SECURING RESOURCES THROUGH PASSWORDS

BACKGROUND OF INVENTION

1. Field of the Invention

The present invention relates to computer methods for managing secure access to protected resources. General methodologies within this field include password protection, encryption, decryption, cryptography, and biometrics.

2. Description of the Related Art

The below-referenced U.S. patents disclose embodiments that were satisfactory for the purposes for which they were intended. The disclosures of the below-referenced prior U.S. patents, in their entireties, are hereby expressly incorporated by reference into the present invention for purposes including, but not limited to, indicating the background of the present invention and illustrating the state of the art: U.S. Pat. No. 5,944,825, "Security and Password Mechanisms In A Database System," Aug. 31, 1999, U.S. Pat. No. 5,699,514, "Access Control System With Lockout," Dec. 16, 1997, U.S. Pat. No. 6,202,158, "Detection Method Of Illegal Access To Computer System," Mar. 13, 2001, U.S. Patent Application 2003/0149900A1, "System And Method For Providing Multi-Class Processing Of Login Requests," Published Aug. 7, 2003, U.S. Patent Application 2002/0067832A1, "Systems, Methods and Software For Remote Password Authentication Using Multiple Servers," Published Jun. 6, 2002, U.S. Pat. No. 5,375,244, "System And Method For Granting Access To A Resource," Dec. 20, 1994. U.S. Pat. No. 6,397,337, "Unified Password Prompt of A Computer System," May 28, 2002, U.S. Pat. No. 6,601,173, "Multi-User Internet Access and Security System," Jul. 29, 2003, U.S. Pat. No. 6,240,184, "Password Synchronization," May 29, 2001, U.S. Pat. No. 5,682,475, "Method And System For Variable Password Access," Oct. 28, 1997, U.S. Pat. No. 5,581,700, "Hierarchical Multiple Password Acceptance System," Dec. 3, 1996, U.S. Pat. No. 5,793,951, "Security and Report Generation Systems for Networked Multimedia Workstations," Aug. 11, 1998, and U.S. Pat. No. 5,931,948, "Portable Computer System Having Password Control Means For Holding One Or More Passwords Such That The Passwords Are Unreadable By Direct Access From A Main Procedure," Aug. 3, 1999.

SUMMARY OF INVENTION

When a user attempts to log on to a secured computer resource, his password is typically "locked out" after he enters a specified number of consecutive invalid passwords. The invention increments this lockout count by a variable amount based on comparison of a submitted invalid password relative to a valid password. As a result, the lockout count is increased less severely for invalid access attempts which reflect typographical errors than for invalid access attempts more likely to stem from a hacker attack.

Another aspect of the invention applies to an environment where multiple software applications share a common user identifier (userid). These applications store the userid's password in persistent storage (e.g., in a file or in memory). Coordinating the changing of passwords in this environment is difficult. One inventive solution for mitigating the password coordination problem is to have multiple valid passwords for a userid. By stratifying the expiration dates of these passwords across time, it is no longer necessary to coordinate each application's use of a password change to occur at the same time. Another embodiment for mitigating the password coordination problem is achieved through centralized password control and management. This embodiment keeps track of all application usages of each shared userid/password in a data repository. This data repository contains details on the application and the userid/password it is using to access a particular resource. When a userid's password is changed, a program will access the data repository, find the applications using that userid, and automatically update the passwords used by that application. In addition, the program will also automatically verify the usages of each shared userid/password by scanning all the applications at periodic intervals.

More specifically, the invention presents a sophisticated method of authorizing access to an item (such as a data file, a server, a system, a network, a room, a building, a vehicle, or any other "item" that can be protected by password). This processing begins by receiving a presented password (symbols, numbers, characters, sounds, tones, pulses, etc. entered via a signal line, keyboard, keypad, touch pad, audio receiver, light receiver, etc.) from an entity or user desiring access to the item. In this case an entity or "user" can comprise individuals, software applications, application owners, etc. The invention compares the presented password with a stored password and authorizes access if the presented password exactly matches the stored password and denies access if the presented password fails to exactly match the stored password. The invention maintains a lockout count and blocks access to the item if the lockout count exceeds a predetermined value. The difference between denying access and blocking access is that the "denying" process allows additional potentially valid passwords to be presented after an invalid password is presented, while the "blocking" or "lock out" process prevents any additional passwords from being presented (even if they are valid passwords).

One feature is that the invention "variably" increments the lockout counts if the presented password fails to exactly match the stored password. In this process, the invention increments the lockout count different amounts depending upon how closely the presented password matches the stored password. Thus, with this feature, the lockout count is incremented a lesser amount as the presented password matches the stored password more closely and is incremented a greater amount as the presented password matches the stored password less closely. Further, the invention has the ability to not increment the lockout count at all if the presented password is the same as a previously presented password that was entered within a predetermined previous time period.

When determining how closely the presented password matches the stored password, the invention evaluates whether the difference between the presented password and the stored password relates to common typographical errors. Further, when determining how closely the presented password matches the stored password, the invention classifies the difference between the presented password and the stored password into different types of password errors and these different types of password errors cause the lockout count to be incremented by different values. For example, the different types of password errors can include missing characters, extra characters, transposed characters, incorrect upper or lower case usage, no matching characters, one-quarter matching characters, one-half matching characters, etc.

The invention also provides a methodology that allocates a plurality of the same passwords to a plurality of users who share the same userid. The invention allows continuous operation of the item being accessed by providing that each of the passwords has a different expiration date. This allows different passwords to be simultaneously valid. Also, while one password is expiring, at least one other password is unexpired, eliminating the necessity of shutting the item down when the password is changed. This aspect of the invention allows access to the item when any of the users supplies any one of the passwords before the password supplied has expired.

This embodiment notifies all of the users when each password expires. Also, the invention makes the expiration date for additional passwords different than the expiration dates for any other passwords when allocating additional passwords to the users. The invention can reset the expiration dates of the passwords, such that the expirations dates are evenly spaced in time. If, during the process of allowing access, one user enters an expired password prior to entering an unexpired password, the invention notifies the user that the expired password has expired after the user has entered the unexpired password.

Also, when dealing with situations where a plurality of users share the same userid and the same password, the invention maps information associated with the users to the password in a data file and periodically updates the data file. This embodiment also notifies the users of the expiration of the password a predetermined time period before the password expires. The invention can periodically contact the users to confirm accuracy of the information within the data file. The invention can also notify at least one corresponding third party identified in the data file if the user is denied access to the item because of an invalid password.

Thus, the invention is useful in an environment where multiple software applications share a common user identifier (userid). These applications store the userid's password in persistent storage (e.g., in a file or in memory). Coordinating the changing of passwords in this environment is difficult. The invention mitigates the password coordination problem by having multiple valid passwords for a userid. By stratifying the expiration dates of these passwords across time, it is no longer necessary to coordinate each application's use of a password to occur at the same time. Another solution for mitigating the password coordination problem is achieved through centralized password control and management. In this embodiment, a centralized encrypted table maps application information to each of its userids and the valid password of the userid. Any changes to a userid's password is controlled centrally and automatically distributed to the corresponding application's persistent storage.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

FIG. 13 is a table illustrating one embodiment of the invention; and

DETAILED DESCRIPTION

Many computer operating systems are designed to lock a userid (disable its password) when multiple attempts are made to login using invalid passwords. This approach improves security by minimizing the probably of unauthorized access due to a variety of hacker techniques such as automated dictionary attacks and guessing passwords by trying commonly used passwords such as birthdays, names of relatives, etc.

Figure 1:
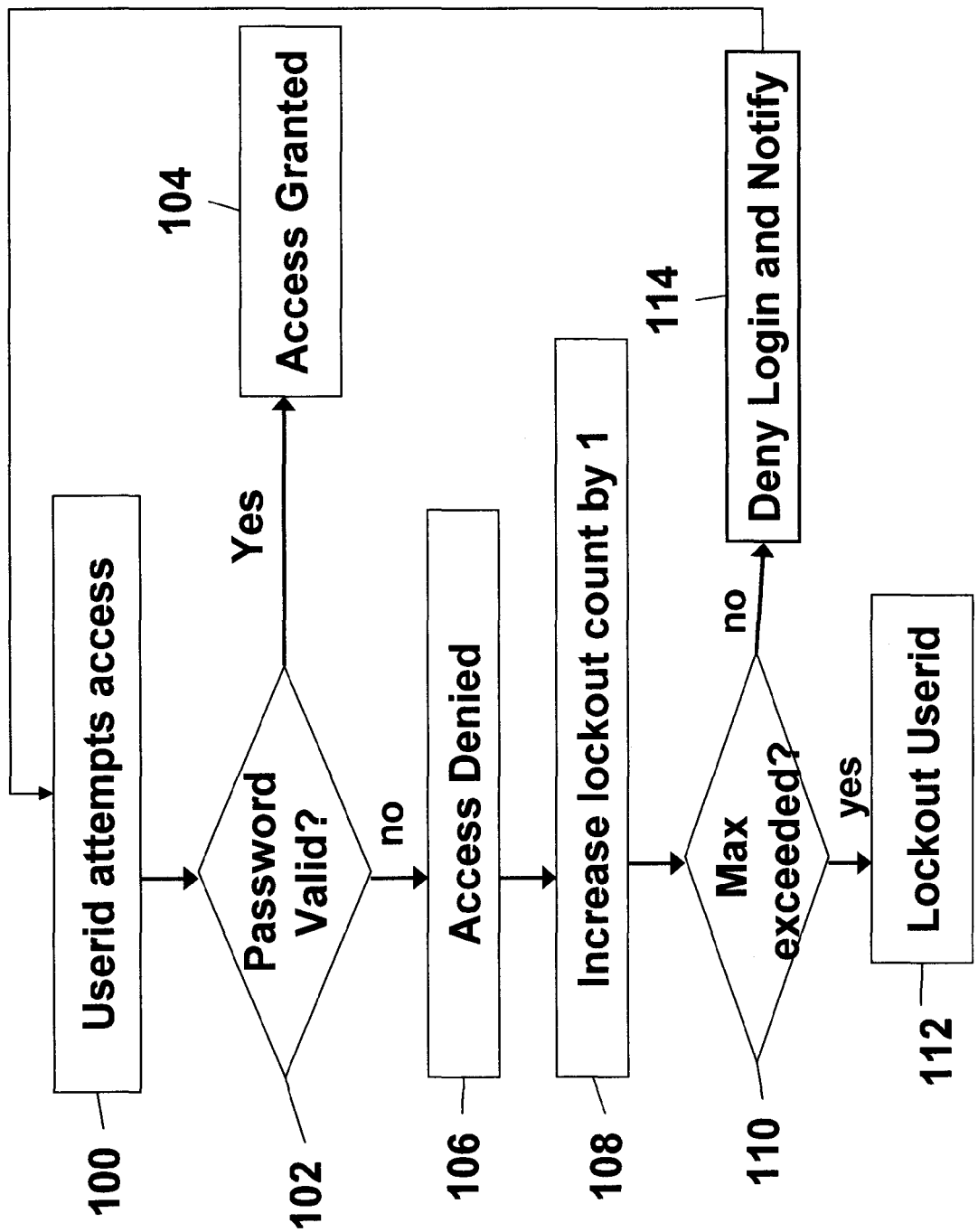
FIG. 1 is a flowchart illustrating steps for locking out userids.

One method for lockout is summarized in FIG. 1. In block 100, the user identifier (userid) attempts to access the system (or system resource) through the provision of a userid and password. Block 102 checks to see if the entered password is valid. If the password is valid, access is granted and the userid's lockout count is reset to zero (block 104). If the password is invalid, access to the system is denied (block 106) and the lockout count for that userid is incremented by one (block 108). Block 110 checks to see whether an invalid password has been entered for that userid too many consecutive times. The lockout count for the userid is compared with the maximum number of permitted consecutive invalid passwords. Typically, the maximum number of permitted consecutive invalid passwords ranges between two and six. If the lockout count exceeds the maximum, the userid is locked out (block 112) which means the userid's password is revoked. No more access is permitted via that userid until the userid's password is reset. Conversely, if an invalid password has not been entered too many consecutive times, then the user is denied access to the system resource and notified (block 114).

While this conventional method's "lock out" mechanism is designed to prevent nefarious entry, more often, it disables userids due to innocent human error. For example, a human may forget that the old password has expired and stubbornly retry it a few times, perhaps thinking he may have made typing errors. As another example, a human may think there is a "systems network problem" and retry an application every hour (not realizing that the application is failing due to an invalid password). In other words, the conventional lockout method hinders the "good guys" as well as the "bad guys." Userid lockouts are inconvenient for application users and expensive to administer. According to some estimates, between 20% to 50% of all help desk calls are for password resets, and the average help desk labor cost for a single password reset is about $40. For professionals waiting on hold for a help desk person, the implied cost of password resets is even higher.

To mitigate the adverse affect due to invalid (but innocent) passwords, the present invention increments a lockout count by a variable weight based on comparison of a submitted invalid password relative to a valid password.

The present invention mitigates the problem of userids being locked out due to human error. The invention identifies invalid logon attempts which are likely to be due to human error and weights these with lesser magnitude than those logon failures more likely to stem from hostile intrusion. Consequently, while the conventional methods may revoke a userid's password after say four failed attempts, the present invention will revoke the userid after say 20 failed attempts which are likely due to human error or three failed attempts which do not appear to stem from human error. Thus, while security is maintained, fewer lockouts will occur. This minimizes inconvenience and inefficiency due to innocent human error without sacrificing security.

More specifically, the invention presents a sophisticated method of authorizing access to an item (such as a data file, a server, a system, a network, a room, a building, a vehicle, or any other "item" that can be protected by password). This processing begins by receiving a presented password (symbols, numbers, characters, sounds, tones, pulses, etc. entered via a signal line, keyboard, keypad, touch pad, audio receiver, light receiver, etc.) from an entity or user desiring access to the item. In this case an entity or "user" can comprise individuals, software applications, application owners, etc. The invention compares the presented password with a stored password and authorizes access if the presented password exactly matches the stored password and denies access if the presented password fails to exactly match the stored password. Those skilled in the art will recognize that some security systems store the valid password only in encrypted form; such systems compare the encrypted form of the presented password with the stored encrypted password and authorize access only if the encrypted passwords exactly match. It will be obvious to those skilled in the art that all references herein to comparisons of stored and presented passwords apply also to comparisons of encrypted stored and encrypted presented passwords. The invention maintains a lockout count and blocks access to the item if the lockout count exceeds a predetermined value. The difference between denying access and blocking access is that the "denying" process allows additional potentially valid passwords to be presented after an invalid password is presented, while the "blocking" or "lockout" process prevents any additional passwords from being presented (even if they are valid passwords).

Figure 2:
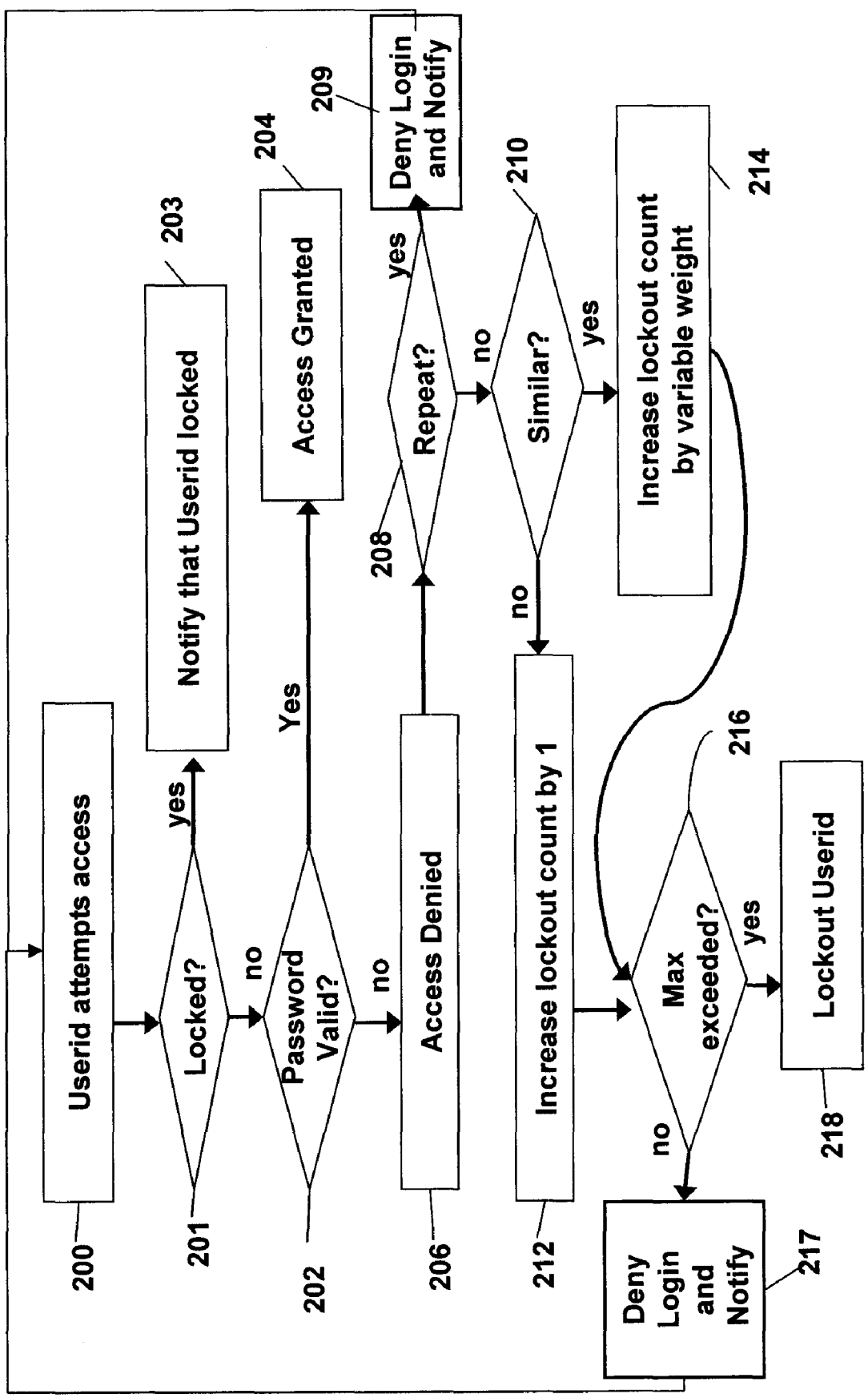
FIG. 2 is a flowchart illustrating steps for locking out userid based on variable weight lockout count.

One embodiment of the present invention is summarized in FIG. 2. In block 200, the user identifier (userid) attempts to access the system (or system resource) through the provision of a userid and password. Block 201 checks to see if the entered userid has been locked out. If the userid has been locked out, then block 203 notifies the user or system attempting access that the userid has been locked and the userid's password needs to be reset. If the userid has not been locked, then block 202 checks to see if the entered password is valid. If the password is valid, access is granted and the userid's lockout count is reset to zero (block 204). If the password is invalid, access to the system is denied and the user or system attempting access is notified that the password is invalid (block 206). Furthermore, if access is denied, blocks 208 and 210 implicitly examine the probability of the incorrect password stemming from an innocent human error. Block 208 checks to see if the incorrect password is the same as a password entered for the userid during a previous specified duration of time, say during the past two months as an example. If the password was entered for that userid during that recent period of time, then it is highly likely that the userid/password attempt was innocent. For instance, the user may have repeatedly entered a password which belonged to another of his userids. In such situations of a repeated incorrect password, there is no need to increase the lockout count and processing proceeds to deny login and notify the user 209 so that the user can make another password attempt 200. However, if the password is not a repeat, the invention proceeds to block 210.

Thus, the invention "variably" increments the lockout count if the presented password fails to exactly match the stored password. In this process, the invention increments the lockout count different amounts depending upon how closely the presented password matches the stored password. Thus, with this feature, the lockout count is incremented a lesser amount as the presented password matches the stored password more closely and is incremented a greater amount as the presented password matches the stored password less closely. Further, the invention has the ability to not increment the lockout count at all if the presented password is the same as a previously presented password that was entered within a predetermined previous time period.

In block 210, the (invalid) entered password is compared with the valid password for the userid. This comparison involves identifying the similarity between the two passwords. The higher the similarity between the two passwords, the lower the value of the variable weight which will be added to the lockout count. For instance, a common typographical error results from typing the characters of a password in an incorrect sequence (e.g., transposition errors, etc.). This may be identified by attempting to swap each adjacent pair of characters in the entered password and checking if the pairwise interchange results in the valid password. If a pairwise interchange results in the valid password, then it is highly likely that the incorrect password entry was due to a typographical error. In this case, the lockout count is increased in block 214 by a variable weight less than one (say by 0.1 as an example). If the pairwise interchange does not result in a valid password, the invention can check for another type of typographical error. Another common error would be somebody inputting an extra character in the password. This could be checked by removing a character from the entered password and checking if the valid password results (try this for each character). If the valid password results from the removal of any character from the entered password, block 214 will increase the lockout count by a variable weight less than one. In this case, it may be appropriate to use a variable weight of say 0.2. To the contrary, if no characters of the entered password match the stored password, the lockout count could be incremented by 1.0 or a higher number. The intention is to use variable weights which are higher when the probability of the password being entered by typographical error is lower. The pairwise interchange and character removal approaches are simply two (of many) ways of examining the similarity of passwords and the implied probability of human error. Other ways of estimating the similarity/probability include, for example, identifying incorrect use of capital letters (e.g., when the password is correct, but is inconsistent with the uppercase and lowercase of the password), identifying missing characters (e.g., when the characters used are the correct characters and are in the correct order, but one or more characters are missing), and many others that would be obvious to one ordinarily skilled in the art given this disclosure.

Thus, when determining how closely the presented password matches the stored password, the invention evaluates whether the difference between the presented password and the stored password relates to common typographical errors. Further, when determining how closely the presented password matches the stored password, the invention classifies the difference between the presented password and the stored password into different types of password errors and these different types of password errors cause the lockout count to be incremented by different values. For example, the different types of password errors can include missing characters, extra characters, transposed characters, incorrect upper or lower case usage, no matching characters, one-quarter matching characters, one-half matching characters, etc.

Further, the different errors could receive different weights when increasing the lockout count. Therefore, an incorrect capitalization might only increase the lockout count by 0.1, typographical errors, such as transposition, etc. might increase the lockout count by 0.3, while other more questionable errors, such as missing or extra letters, might increase the lockout by 0.5. The invention is not limited to these exemplary errors, but instead is useful with any type of error which tends to indicate that the use of the incorrect password is not malicious, but is simply an incorrect data entry. Further, while the weighting is shown as 0.1-0.5, above, any weighting system could be used with the invention.

If there is no observed similarity between the entered and valid passwords, then block 212 increments the lockout count by one or a higher number. Both blocks 212 and 214 lead to block 216 which checks to see whether the lockout count has exceeded the maximum number permitted. If the lockout count exceeds the maximum, the userid is locked out (block 218) which means the userid's password is revoked. The user is denied access and notified of the incorrect password 217 and given another attempt to enter a password 200. No more access is permitted via that userid until the userid's password is reset if the lockout count has not been exceeded.

In contrast to the present invention, conventional methods, such as U.S. Pat. No. 5,944,825 (incorporated by reference), describe the concepts of lockout and password expiration. Also, U.S. Pat. No. 5,699,514 (incorporated by reference) is different than the invention and attempts to minimize human inconvenience due to password lockout by having a two tiered lockout. If the user fails to enter a short password correctly for X consecutive times, he may gain access and restore his password by entering a longer password correctly. Since the second tier's required password is long, it is not as vulnerable to hacker dictionary attempts, while its existence is less inconvenient to the user than a password reset.

U.S. Pat. No. 6,202,158 (incorporated by reference) is also distinguished from the present invention in that this patent presumes that since a given user cannot be in two places at the same time, multiple accesses of a userid/password from more than one geographical location within a short period of time indicate illegal access. Another patent that is contrary to the invention is U.S. Patent application 2003/0149900A1 (incorporated by reference) that provides preferential lock out treatment for users who have logged on successfully in the past. Similarly, U.S. patent application 2002/0067832A1 (incorporated by reference) allows "forgiveness" of incorrect password attempts by a person later entering a correct password. Another method that is different than the present invention is shown in U.S. Pat. No. 5,375,244 (incorporated by reference), which estimates a probability of an illegal resource access attempt by comparing a profile of the attempt with profiles of known fraudulent users. Profiles include: geography, time of day, type of station, number of simultaneous sessions, etc. No known conventional method increases the lockout count as a function of the similarity between an incorrect and correct password as the invention does.

Traditionally, most applications were designed to run on a single computer system under a single user identifier (userid). On occasion complex applications were built to run on multiple computer systems to share the loads but this was the exception rather than the rule. However, recent improvements in "middleware" have facilitated an explosion in software applications which utilize data and processing on a variety of systems and platforms. Furthermore, the reusability of software objects and data directories results in an enormous sharing of software, data, and hardware across many applications. This complexity and integration is expected to increase in the future.

In an on-demand corporate environment/data centre, many software applications run in automated and semi-automated fashion. All the applications need access to information which is secured via userid and password. Different applications have different access levels for different resources each with its own userid and password. Typically, these applications share userids and are distributed and access information on multiple servers and some run for long durations. They store the userid and passwords in persistent storage (e.g., database, property file). While the applications are running, the userids and passwords may be stored in a memory cache.

Figure 3:
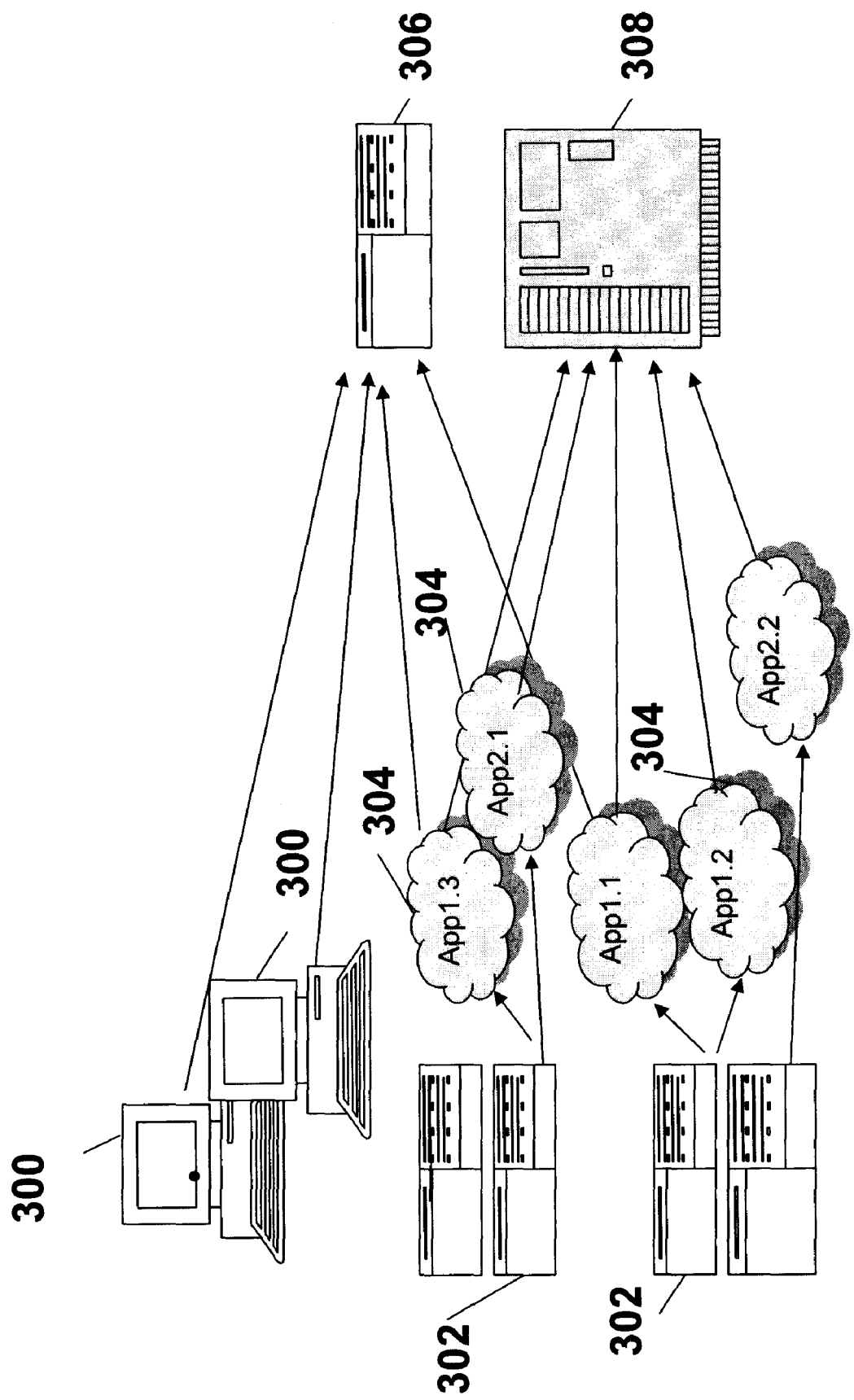
FIG. 3 is a schematic diagram of an on-demand computing environment.

FIG. 3 provides a high level overview of some aspects of an on-demand corporate environment. Blocks 306 and 308 are protected computer resources such as servers or data bases. These resources are accessed by users (block 300) and by applications (block 304) running on a compute server farm/grid 302. An application may access a plurality of protected resources and a protected resource may be accessed by a plurality of applications and users.

Figure 4:
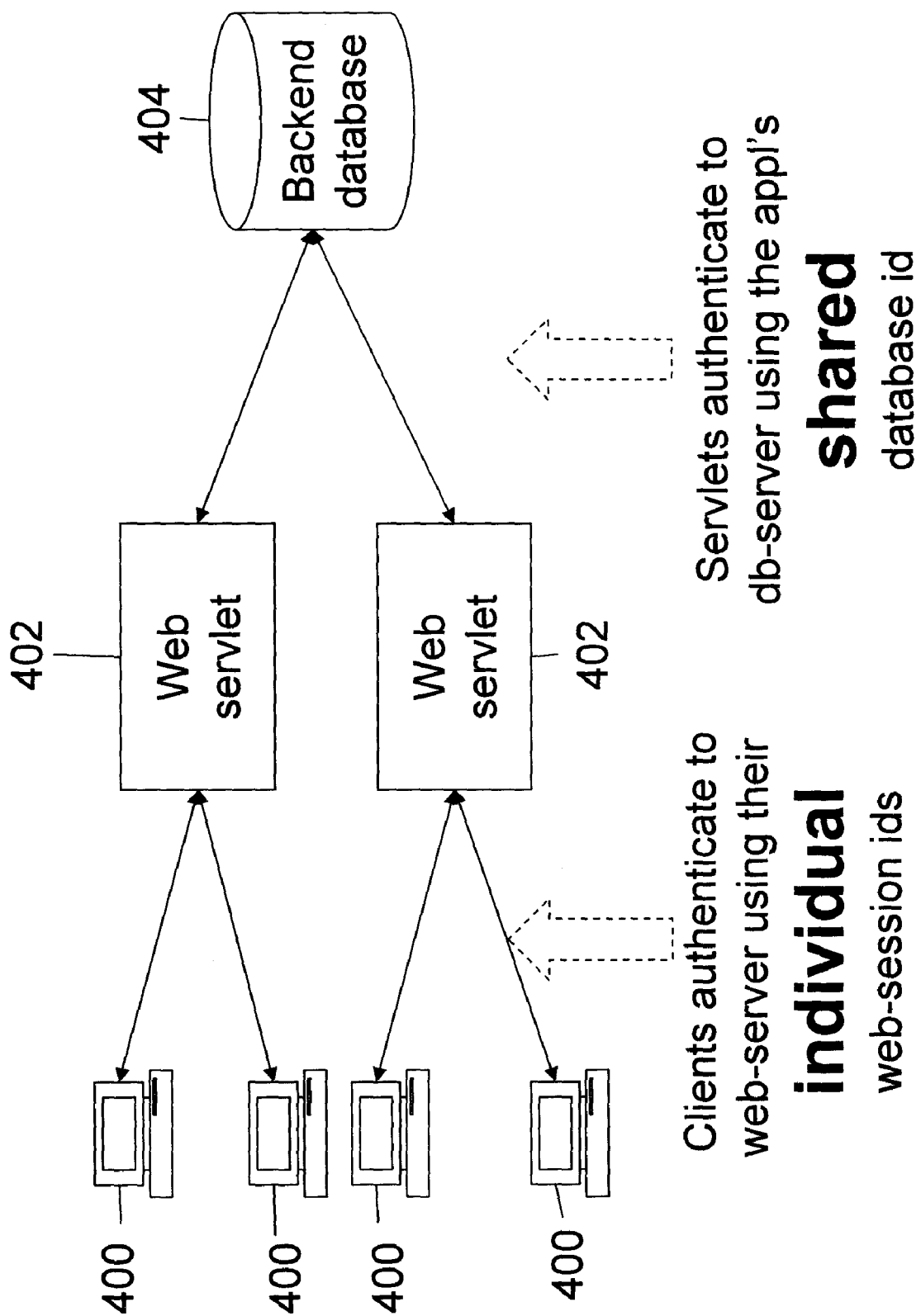
FIG. 4 is a schematic diagram illustrating why userids are shared across applications.

FIG. 4 is an illustration that explains by example why userids are shared by applications. In the example, end-users at front-end web clients (block 400) authenticate to web-servers (block 402) using their individual web-session userids. Once session-authentication is completed the web servlets execute the application functionality. When accessing the backend database (block 404) the web servlets will authenticate using the application's shared database userid. It is impractical to provide each end user with an individual database userid because it makes management of the database onerous; every time a new userid is created or an old one deleted, all appropriate database accesses are granted or denied to that userid. Even worse, every time a table is dropped and recreated, all appropriate database accesses are granted or denied to all userids that access that table. To mitigate these problems, in practice, userids are shared across applications. Note, that throughout this document, the userid-password mechanism of authentication is mentioned in order to simplify the explanation. Those skilled in the art will recognize that the invention is equally applicable to other authentication mechanisms such as digital certificates.

Security has always been, and will continue to be an important factor to be considered when accessing a computer system. In order to ensure that a user logging onto a computer system is bona fide, the target computer system typically does user-authentication before granting access, say for example by doing userid-password verification. Similarly, a process on one computer system that is interacting with another computer system is considered by the target computer system to also be just another user, and user-authentication is done in that case too, before granting access.

It is a problem to change passwords per password maintenance rules of large secure enterprises. All the running applications first have to be stopped before passwords are changed. All the users sharing those passwords have to be notified (so that they do not use an old expired password). The passwords in persistent storage have to be changed and the applications restarted. This has to be coordinated across the enterprise. Coordinating downtime of on-demand server applications is time consuming for programmers and administrators and inconvenient for users who expect 24×7 availability.

Note further, that it is not mandatory that the calling process and the called process reside on separate computer systems. It is entirely possible that they could be running on the same computer system, yet the system design may require that they run under different userids. This means that if a process is running child processes under a different userid (on the same computer system or another computer system(s)) it needs a userid-password combination for each of those computer systems. That in itself, providing a userid-password combination for each target computer system every time a process is first set up, may not appear at first glance to be an onerous task. Unfortunately, in any reasonably complex application, providing an individual userid for each process that needs to access a computer system is impractical. Often, processes that access a computer for similar functionality will end up using the same userid-password when accessing that computer.

The password management task becomes harder when the following factor is considered. To combat the menace of unauthorized access, it is advised that after a reasonable period of time the password of a userid be changed. Many organizations require that passwords expire after 90 or 180 days. This means that after the expiry period, if a login is attempted, the target computer system immediately prompts for a new password. If the password-change protocol is not followed, the login is aborted and access is denied (which means the application functionality will fail). This also means that every time the password is changed, all processes that use this userid-password combination need to be updated with the new password. This is difficult since the remote application processes may not even be easily accessible to the owner/administrator of the userid whose password is being changed. As a result, a situation may arise where one or more processes would attempt to access a computer using an old password, and the access would then be denied, causing the application functionality to fail.

As shown above, again for security reasons, many computer operating systems are configured to "lock" a userid if multiple attempts are made to login using invalid-passwords. Once the userid is locked, all attempts to access the computer using that userid are denied irrespective of whether the password used is correct or incorrect. Many of organizations require that the userid be locked after the 3rd or the 5th invalid attempt. This exacerbates the problem of userid-password maintenance. One or more processes with the invalid password would likely make multiple attempts to access the computer and lock the userid. Subsequent to locking, even processes with the valid password would be denied access.

In large complex systems, the combination of frequent password changes and shared userids often results in repeated catastrophes. Every time the password of a userid is changed, the configuration files (or other persistent storage) of all the other processes that use this userid must be updated. If even one process is forgotten and its configuration file is not updated with the newest password it could end up locking the userid for all processes.

To overcome the above problems, the invention provides an easily managed mechanism for password administration which does not require on-demand applications to be shut down during a password change. This is accomplished by allowing a single userid to have multiple passwords that expire at different times. Each of these passwords can be active at the same time, and each would have a different expiration date. When an application attempts to access a resource, it provides a userid and multiple passwords; as long as one of these passwords is valid, access is granted.

The invention sets password expiration dates so that they meet corporate security guidelines and are stratified across time. By staggering the expiration dates, the passwords may be changed when convenient without impacting the 24×7 service windows of the on-demand applications. As long as one of the application's passwords remains valid, access to the resource is granted. The passwords in persistent storage will be updated following the change of a password so that the next time the application is restarted, the new password will take affect.

Thus, the invention provides a method for multiple applications sharing userids/passwords wherein a single userid may have a plurality of passwords, each with different expiration dates. The invention is especially useful for actions taken by systems administration programs during new userid creation, change of password, and password authentication during login or other attempt to access a secure resource. The invention allocates a plurality of the same passwords to a plurality of users who share the same userid. The invention allows continuous operation of the item being accessed by providing that each of the passwords has a different expiration date. This allows different passwords to be simultaneously valid. Also, while one password is expiring, at least one other password is unexpired, eliminating the necessity of shutting the resource down when the password is changed. This aspect of the invention allows access to the item when the any of the users supplies any one of the passwords before the password supplied has expired.

Figure 5:
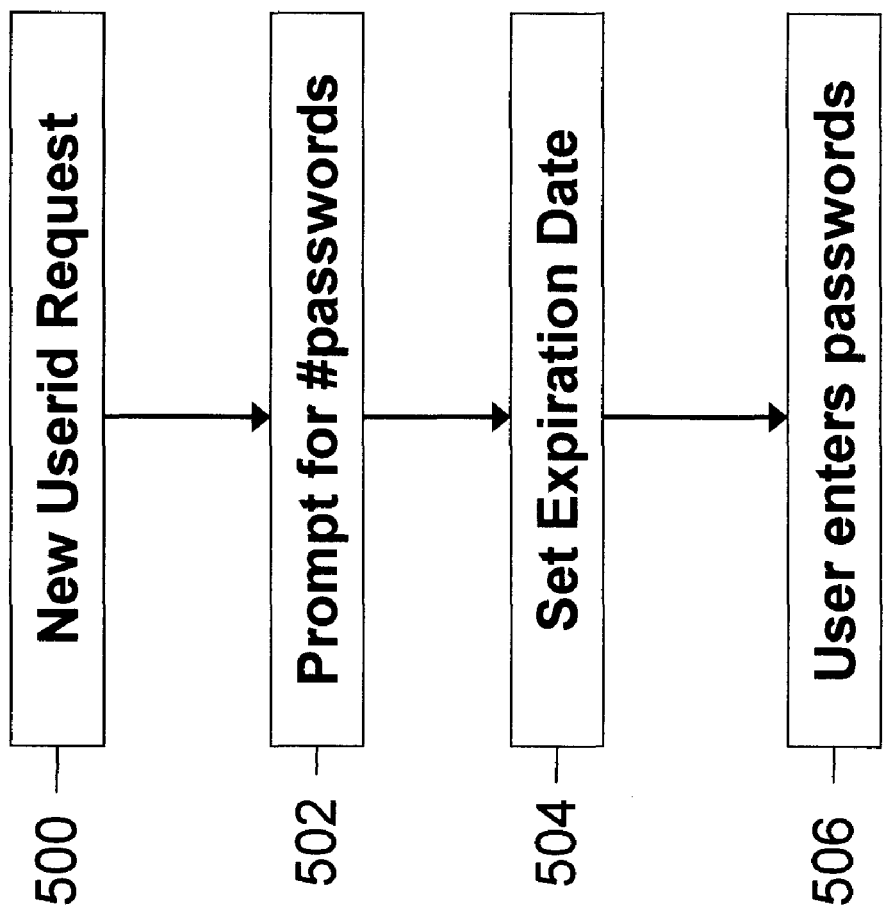
FIG. 5 is a flowchart illustrating steps for creating a userid with a plurality of passwords.

The creation of a new userid is outlined in FIG. 5. In block 500, the user requests a new userid. In this embodiment, block 502 prompts the user to specify the number of passwords desired for the userid being created or modified. For ease of explanation, and without loss of generality, the following example uses three passwords that are chosen to exist for each userid and presumes that corporate guidelines require each password to be changed every 60 days; however, as would be understood by one ordinarily skilled in the art any number of passwords and any time periods will be operable with the present invention. Block 504 sets the expiration dates of the three passwords so that their expiration dates are stratified across time. In this example, the three passwords will expire in 40, 50, and 60 days respectively. These expiration times are chosen to respect the preference to balance the desire to change passwords infrequently with the desire to have a comfortable period of time between password expirations. Other expiration times could be chosen in alternative embodiments. Block 506 provides the user with the mechanism to enter a password associated with each of the three expiration dates.

Figure 6:
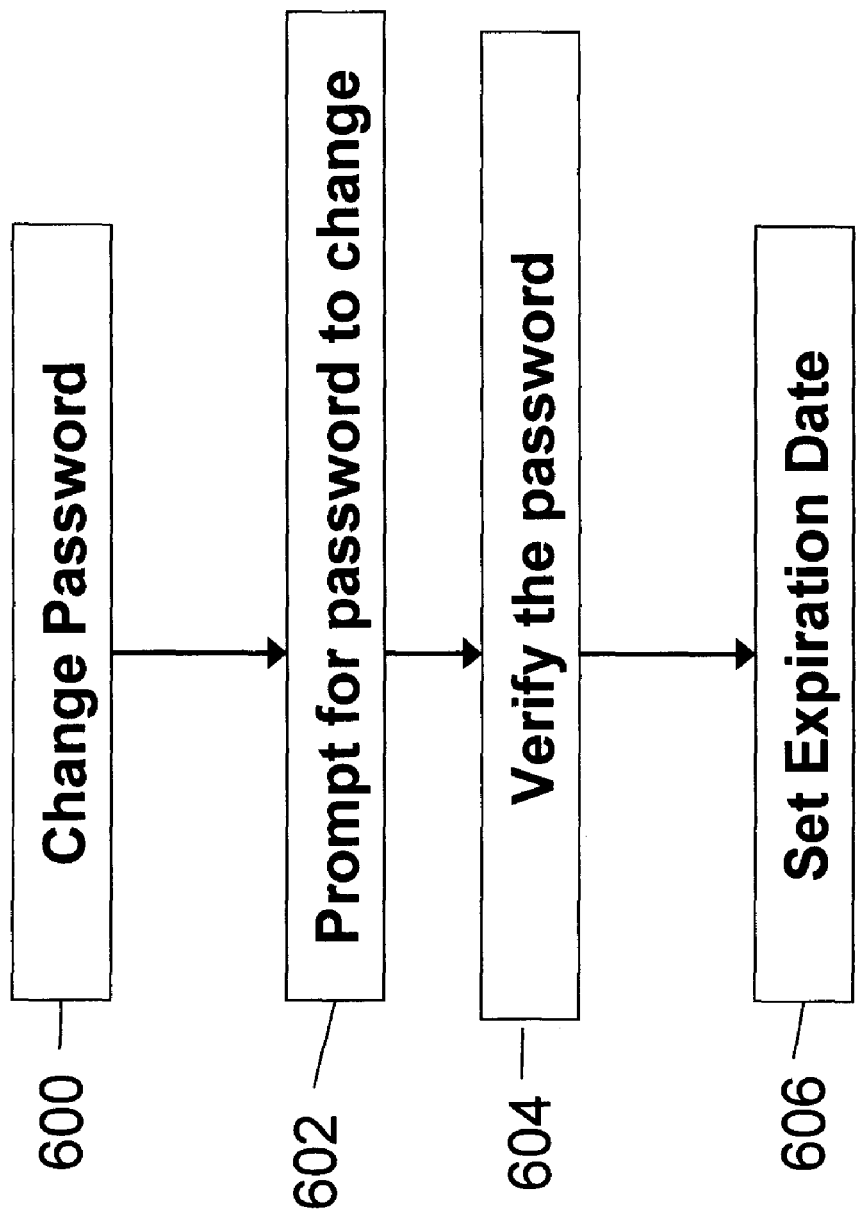
FIG. 6 is a flowchart illustrating steps for password change when a plurality of passwords are present.

FIG. 6 outlines the one embodiment involved when the user changes a password. In block 600, the user requests the system to change the password. The system prompts the user for the password to change in block 602. When the user enters the password, it is compared with the list of valid passwords in block 604. If the user entered password matches one of the valid passwords for the userid, then the system would replace that valid password with a new password the user enters and use any of a variety of methods to assign a new expiration date for that new password (block 606). One of the methods simply sets the expiration date to the current date +60 days (where the number 60 can vary along with the organization's policy as will be readily apparent to one skilled in the art). The system will provide feedback to the user as to the userid's passwords and their expiration dates. Thus, this simple embodiment allows the user to stratify the passwords" expiration dates across time by manually stratifying the dates on which the user changes the passwords. So long as the user stratifies the dates of the password changes, the passwords" expiration dates will be stratified.

Figure 12:
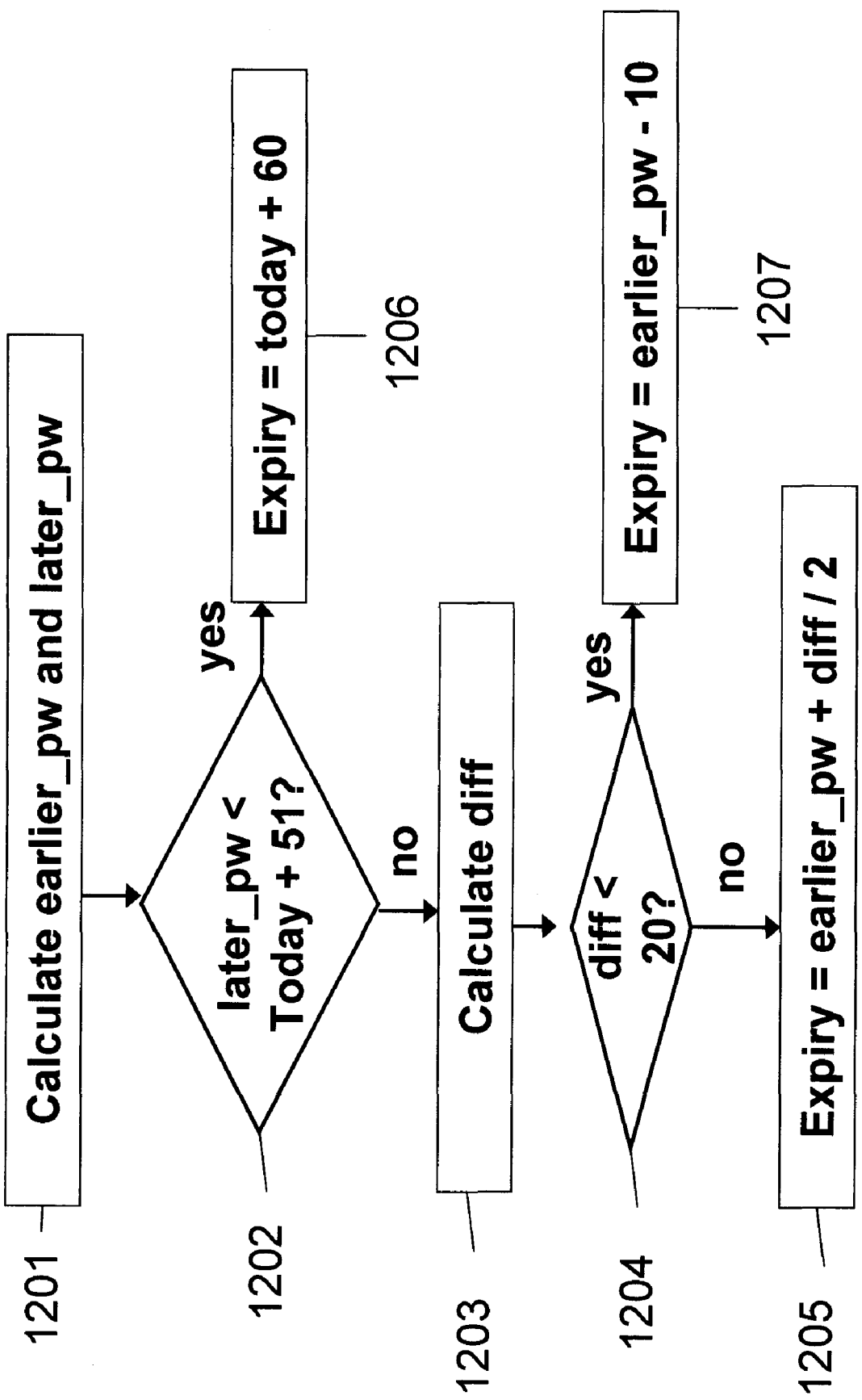
FIG. 12 is a flowchart illustrating steps for stratifying password expiration dates.

An alternative embodiment of block 606 is illustrated in FIG. 12. In this alternative embodiment, the new password'a expiration date is determined with an objective of systematically (and automatically) stratifying the expiration dates of the userid's passwords across time. In this illustrative embodiment with three passwords, the user is changing one, leaving two others unchanged. From the expiration dates of these two other passwords, block 1201 calculates earlier_pw as the earlier of the other two passwords" expiration dates and later_pw as the later of the other two passwords" expiration dates. Block 1202 checks to see if the later_pw is earlier than today +51 days. If it is, then block 1206 sets the expiration date of the new password to today +60 days. Otherwise, block 1203 calculates the difference between the two expiration dates as later_pw earlier_pw. Block 1204 compares the difference with one embodiment number of 20. (Those skilled in the art will recognize that other numbers can be used.) If the difference between the expiration dates is less than 20, then block 1207 sets the expiration date of the new password to ten days earlier than the earlier_pw. Otherwise, block 1205 sets the expiration date of the new password to be about half way between the earlier_pw and later_pw (i.e., sets it to earlier_pw+half of the difference between the password expiration dates and rounds to the nearest date). Thus, this portion of the invention evens out the times between when each of the passwords will expire, and other similar methodologies could be used to similarly stratify the expiration times.

Figure 7:
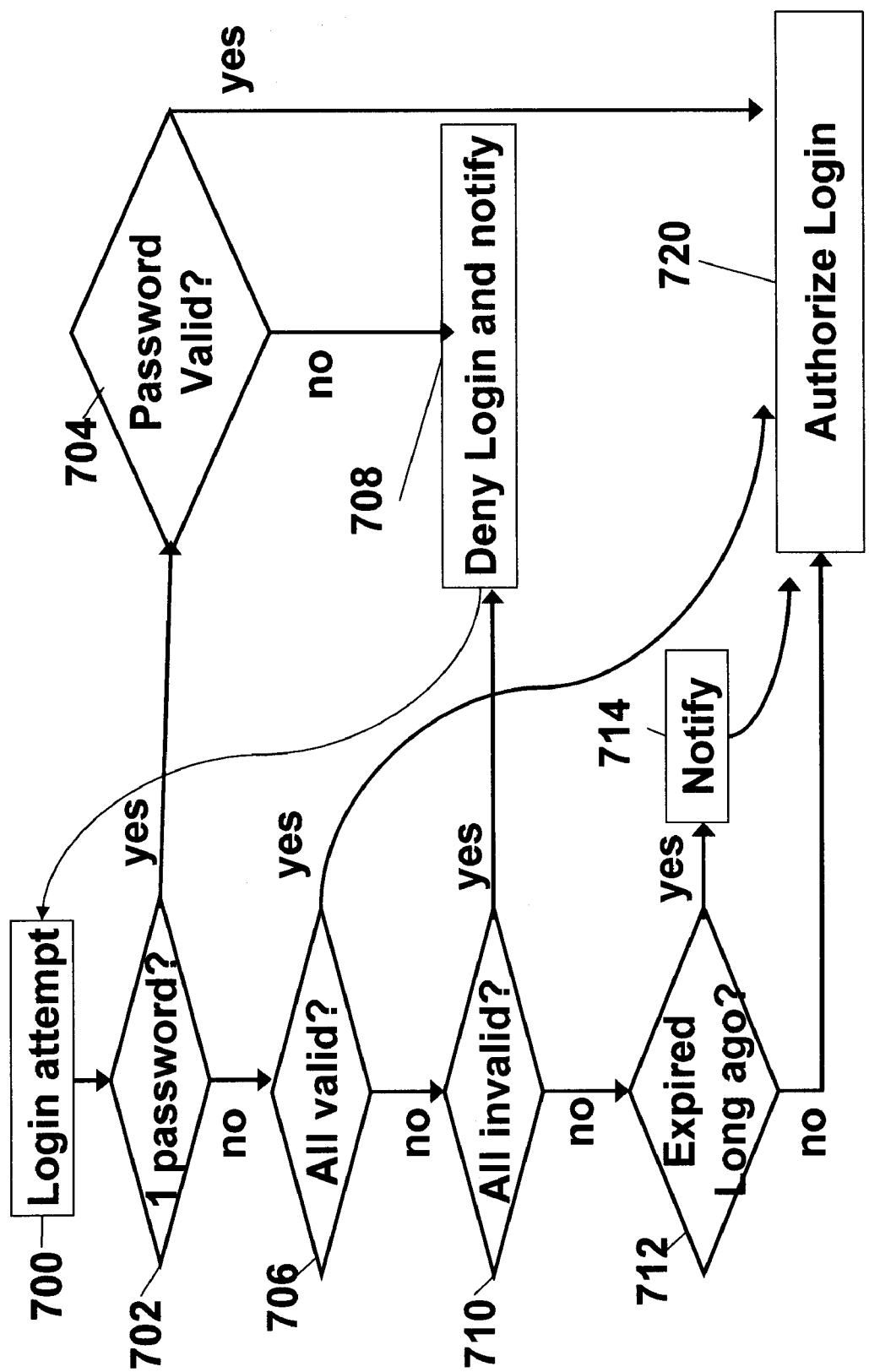
FIG. 7 is a flowchart illustrating steps for password authentication when a plurality of passwords exist.

FIG. 7 outlines one embodiment for password authentication when there are multiple passwords. In block 700, a user or application program attempts to log on to the system or access a secure computer resource. Block 702 checks how many passwords were entered. The multiple passwords can be entered sequentially (e.g., if the first does not allow access, subsequent passwords could be entered, one at a time) or all passwords can be entered simultaneously.

If one password was entered, then block 704 checks if the entered password was correct (i.e., matches an existing valid password that has not expired) and authorizes or denies login with notification accordingly (blocks 720 and 708 respectively). If more than one password was entered, then block 706 examines whether all the entered passwords are valid. If all the entered passwords are valid, then block 720 authorizes the login; otherwise, block 710 examines whether all of the multiple passwords entered are invalid. If all of the multiple passwords entered are invalid, then the login is denied and the user or application is notified of the access denial and its cause (block 708) and processing returns to item 700 to allow another password to be attempted.

Block 712 executes under the condition when multiple passwords are entered and some of them are valid and others are invalid. If block 712 determines that an invalid password has been expired more than a predetermined time period (say 5 days ago), then the person responsible for administering the application using that expired password is electronically notified that the password expired 5 days ago and needs to be changed (block 714). If any of the entered passwords are valid, the login is authorized (block 720).

Thus, this embodiment notifies all of the users when each password expires. Also, the invention makes the expiration date for additional passwords different than the expiration dates for any other passwords when allocating additional passwords to the users. The invention can reset the expiration dates of the passwords, such that the expirations dates are evenly spaced in time. If, during the process of allowing access, one of the users enters an expired password prior to entering an unexpired password, the invention notifies the user that the expired password has expired after the user has entered the unexpired password.

Allowing multiple valid passwords for a userid and stratifying their password expiration dates across time allows for applications sharing userids to have their set of passwords updated in a convenient manner. No longer will all "on-demand" applications be shut down while their userid's password is changed. Instead, each of a userid's passwords expires at a different time and, thus, each password may be changed during a different block of time, during which time other passwords are valid. Since these blocks of time can be long (e.g., ten days), the passwords can be changed by each application's administrator at his or her convenience.

In contrast to the present invention, U.S. Pat. No. 6,397,337 (incorporated by reference) provides a mechanism for a systems administrator to logon to a userid without knowing the userid's password. This is implemented by having the password authentication process check first for the userid's password and, that failing, check to see if the entered password matches the systems administrator's password. By analogy, U.S. Pat. No. 6,397,337 provides a "master key" which opens any userid's door. In contrast, the present invention provides a set of keys which opens a single userid's door. U.S. Pat. No. 5,581,700 (incorporated by reference) is similar to U.S. Pat. No. 6,397,337 in that a single computer may be accessed by a plurality of passwords. U.S. Pat. No. 5,581,700 provides for a hierarchy of passwords whereby as example, the bottom of the hierarchy is the user accessing with his password, followed in the hierarchy by a system's administrator using his (master key) password, followed by the administrator's boss using his (super master key) password, etc.

U.S. Pat. No. 5,793,951 (incorporated by reference) is different than the present invention and has a single master computer send a series of passwords to a networked computer. If one of the passwords is valid, access is granted; otherwise, the master computer administrator is prompted to provide a valid password and if he so does, the password is added to the series of passwords used during subsequent access attempts. This patent recognizes multiple passwords being valid for a computer resource but only in the context of a single master computer, not in the context of multiple application programs using a set of multiple passwords for a single userid. Furthermore, U.S. Pat. No. 5,793,951 does not address the varying expiration dates of the passwords. U.S. Pat. No. 5,931,948 (incorporated by reference) discusses a portable computer hardware implementation containing a plurality of passwords but only one password per resource accessed. Thus, no known conventional method provides a plurality of application programs sharing userids/passwords, a plurality of passwords per single userid, along with stratification of password expiration dates.

One common aspect of the above embodiments is that they are an integral part of the login process. In some situations, this may not be politically, administratively, or technically feasible. Consequently, an alternative embodiment for password management which does not require a change to the login process is presented. This alternative embodiment provides a systematic method for maintaining and controlling password changes in an environment where multiple applications share the same userid. This method may be automated and thus facilitates consistency of remote userid/password access among these multiple applications. Furthermore, this provides a method for periodically verifying whether the password that will be used by a remote-process is valid. This has the potential of trapping invalid passwords even before they are used, thus reducing the chance of a userid getting locked.

The heart of the embodiment for centralized password management is a table shown in FIG. 13, which maps information about a userid to its uses by various application programs. Refer to this table as, "the centralized password management table (CPMT)." Each record of the CPMT contains userid, userid-hostname (the name of the system or server on which the userid exists), userid-password (the password of the userid, probably encrypted), userid-expiry (the date on which the useri's password expires), userid-owner (email address or other info required to contact owner of the userid), userid-expiry-leadtime (#days prior to userid-expiry when the userid is notified of impending password expiry), userid-invalid-count (counts the number of times by period, say month, when login was attempted with an invalid password for the userid), application (name of the application or configuration file containing the userid & password; the application-name includes the full directory path, if applicable, of the application or configuration file), application-host (name of the system or server(s) where the application or configuration file resides), application-owner (email address or other info required to contact owner of the application or configuration file), application-rule (information on how to access and update an applicatio's usage of the userid-password when the userid-password changes; a simple application-rule may indicate whether the application should be automatically updated or provide email notification to a specified email address when the userid-password changes; a more complicated application-rule would provide instructions for executing a specified action on the application using a remote agent and encryption/decryption approach chosen). The fields shown in FIG. 13 are merely examples, and one ordinarily skilled in the art would understand that more, less, and different fields could be used, depending upon the specific application of the invention.

Those skilled in the art will recognize that it is possible to normalize the CPMT mapping relationships thus, dividing the CPMT information into multiple tables, data bases, or files. For ease of explanation, we refer to the CPMT as a single table recognizing that others may choose to implement the relationships using multiple tables. Thus, when dealing with situations where a plurality of users who share the same userid also share the same password, the invention maps information associated with the users to the password in the CPMT data file and periodically updates the data file. This embodiment also notifies the users of the expiration of the password a predetermined period before the password expires. The invention can periodically contact the users to confirm accuracy of the information within the data file. The invention can also notify at least one corresponding third party (userid-owner, application-host, application-owner, etc.) identified in the data file, if the user is denied access to the item because of an invalid password.

Figure 8:
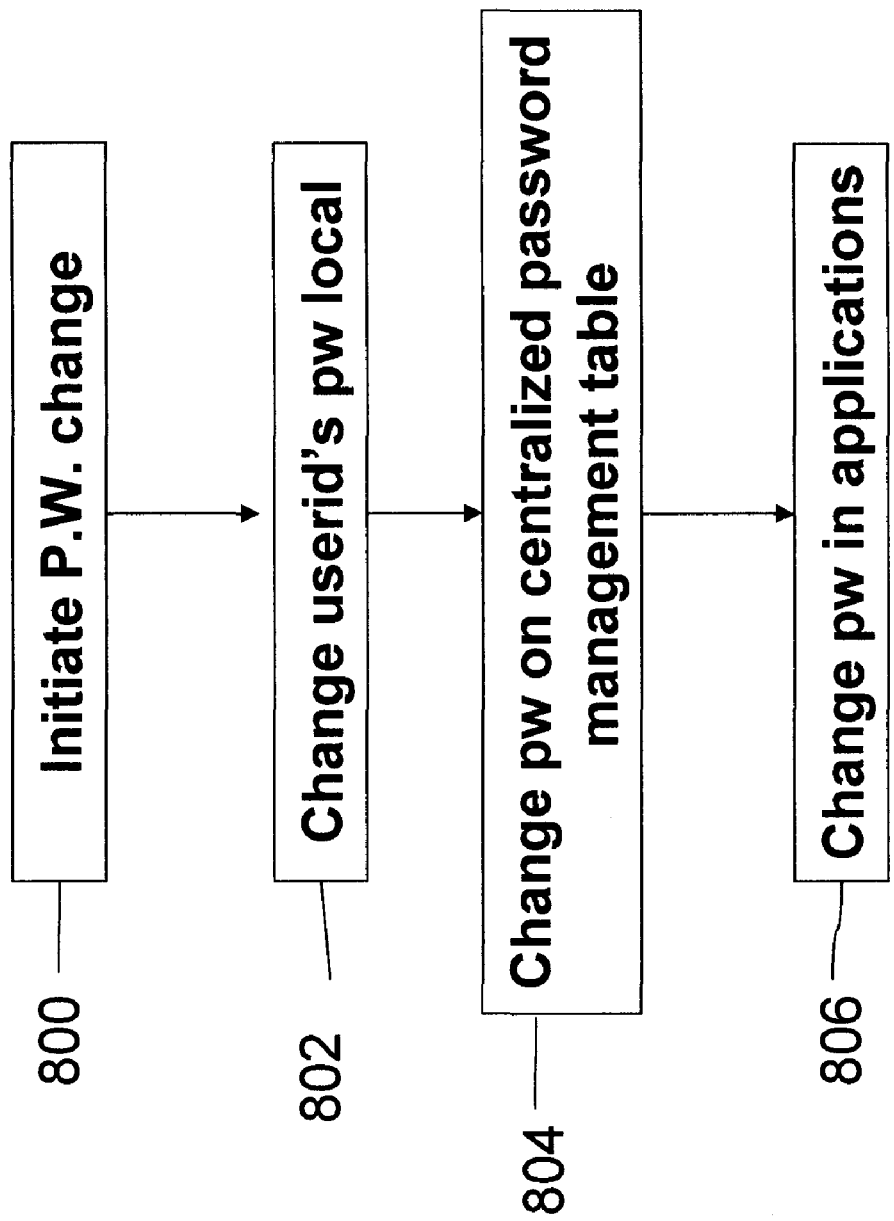
FIG. 8 is a flowchart illustrating steps for password change when password usage is managed centrally using the centralized password management tool (CPMT)

The CPMT is used in several ways to efficiently manage passwords in an on-demand environment where many applications share the same userids. One of these methods is summarized in FIG. 8. In block 800, the password change of a userid is initiated. Typically, the password change will be initiated by a user though there is nothing in the present invention which requires the password change to be initiated by a person. In block 802, the useri's password is changed on its host system or server(s). Block 804 changes the userid-password in the CPMT. Block 806 uses information in the CPMT to update the applications and configuration files which keep the userid and associated password in persistent storage. Sometimes these application and configuration files reside on the same system as the CPMT. In these situations the application may be updated directly. In other cases, the application and configuration file reside on remote systems. In these cases, a remote agent can update the remote usage of the password in the application or its configuration file. Optionally, the application-rule contained within the CPMT will indicate that an email notification should be sent to notify the person responsible for maintaining the application or configuration file that the password can be changed manually. Whether remote updates of application password usage is done automatically or manually depends on a number of factors including the technical feasibility of an automatic update and the perceived security threat of allowing automatic updates to occur, and all of this would be captured in the appropriate application-rule.

Figure 9:
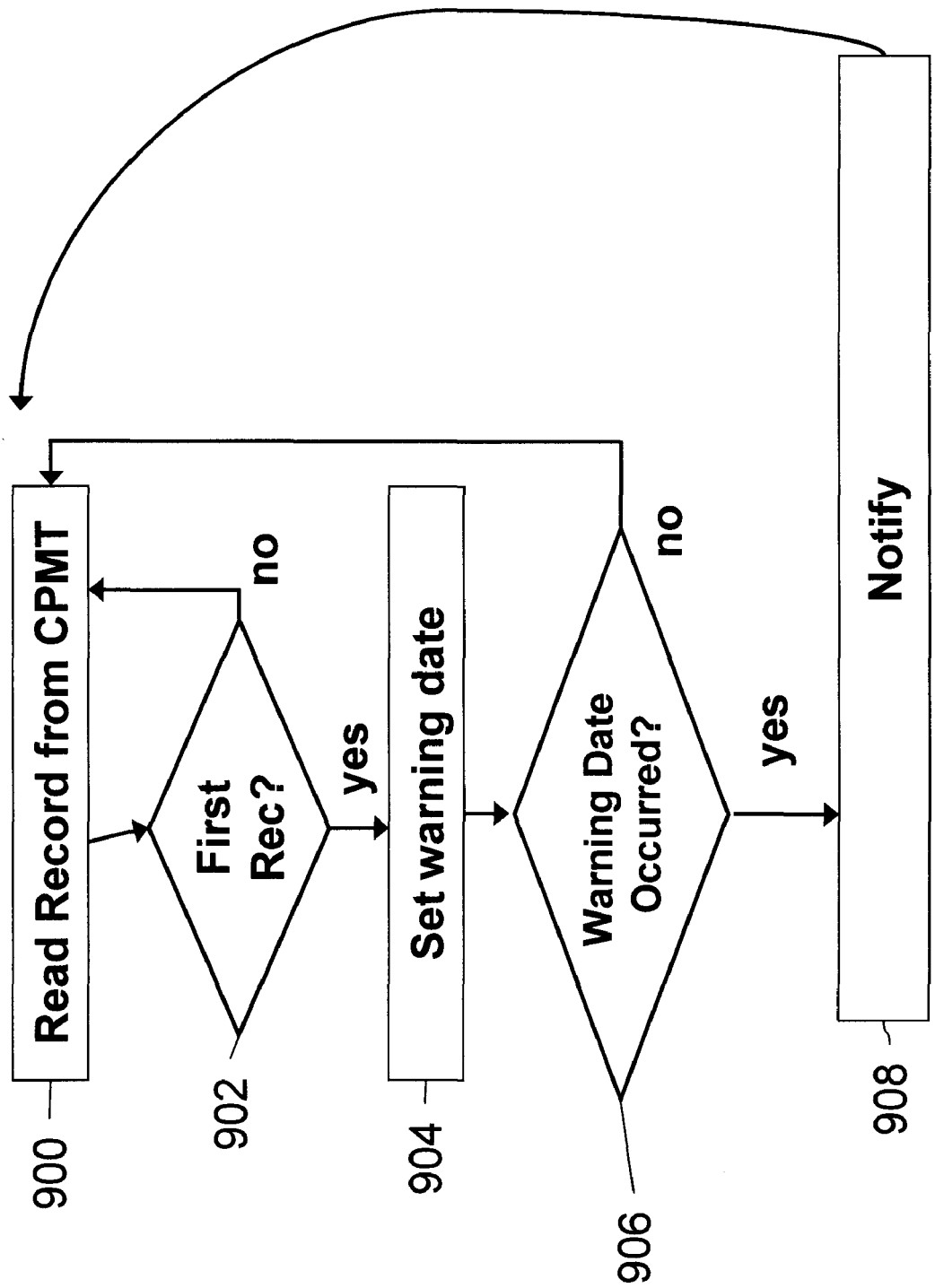
FIG. 9 is a flowchart illustrating steps for advance notification of passwords soon to expire.

FIG. 9 summarizes one embodiment involved in a program which scans the CPMT for the purpose of providing notification of upcoming password expirations. This program is run on a periodic basis (e.g., bi-weekly). Block 900 reads a record from the CPMT. Block 902 checks to see if this is the first record processed for the userid/userid-hostname combination. If it is not, then the next record is read (block 900). If it is the first CPMT record processed for the userid/userid-hostname combination, then block 904 sets the warning date equal to the date the useri's password is scheduled to expire (userid_expiry) minus the predetermined lead-time (userid-expiry-leadtime). Block 906 checks to see if the resulting warning_date has occurred (e.g., if the current date is equal to or past the warning date). If it is, then block 908 notifies the userid-owner (probably via electronic mail) that the useri's password is scheduled to expire on the userid-expiry date. The intention is to provide advance warning so that the responsible person knows to change the password prior to its expiration. Furthermore, the invention can warn the person responsible for the application programs of the impending need for password change by using the appropriate application-rule for notification details. In any event, after this CPMT record is processed, the program flow returns to block 900 to read the next record. Processing stops once all records have been read.

Figure 10:
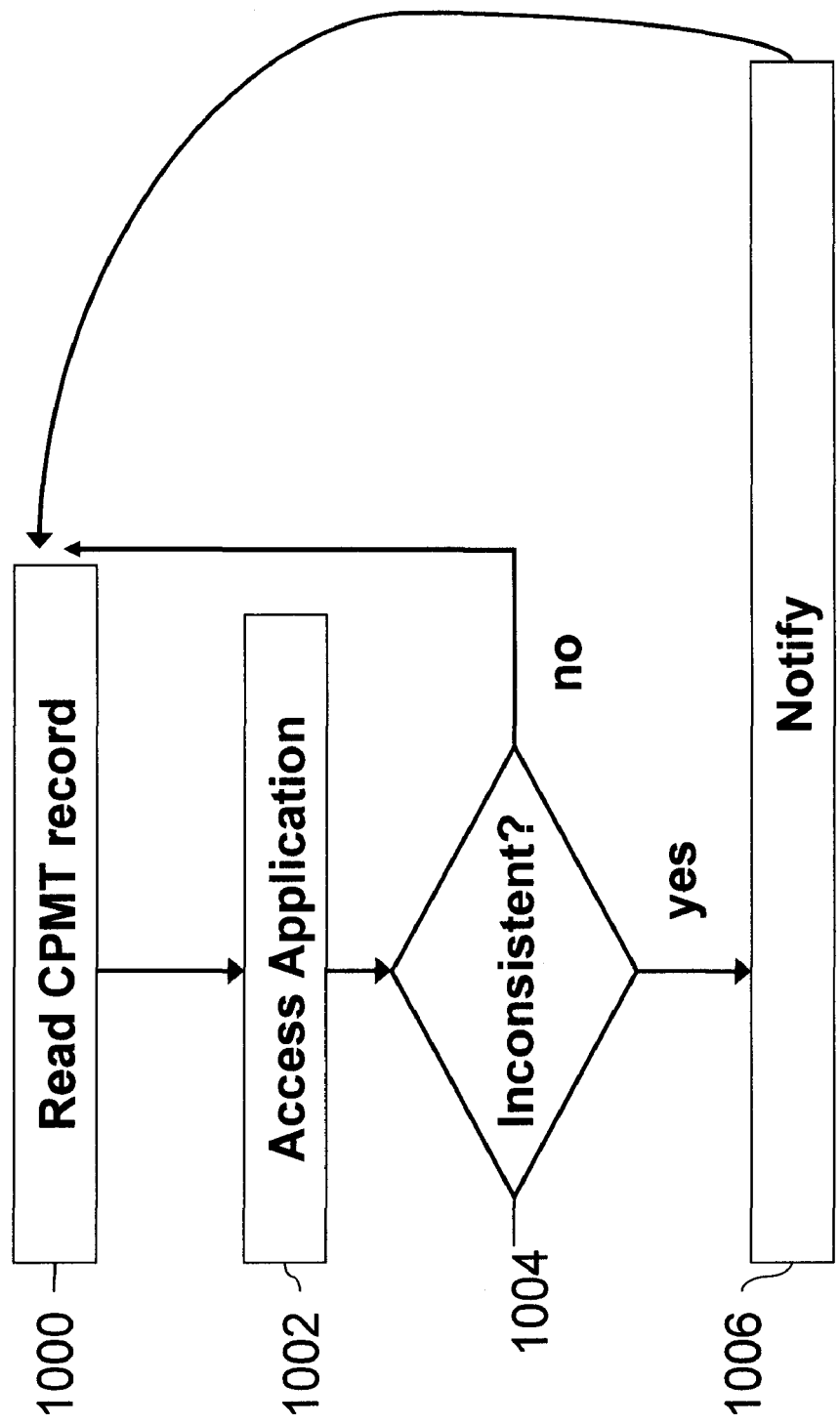
FIG. 10 is a flowchart illustrating steps for ensuring consistent password usage.

FIG. 10 summarizes one embodiment involved in a program which scans the CPMT for the purpose of ensuring consistent usage of a useri's password even before the application attempts to use the password. In this embodiment, this program runs on a periodic basis (e.g., daily). In an alternative embodiment, it could be implemented to be an integral part of the login process and run every time an attempt is made to login using a userid with an invalid password. The method outlined in FIG. 10 processes one CPMT record at a time beginning with block 1000 which reads the next CPMT record. Block 1002 accesses information in the application or its configuration file to ascertain whether the applicatio's stored password is consistent with the CPMT userid-password (the latter presumed to be the useri's valid password). If the application resides on a remote system, accessing its password may require using information encoded in the corresponding CPMT application-rule. If block 1004 identifies inconsistent passwords, then block 1006 notifies the userid-owner and application-owner. In any event, after the CPMT record is processed, the program flow returns to block 1000. Processing stops once all CPMT records have been read.

Figure 11:
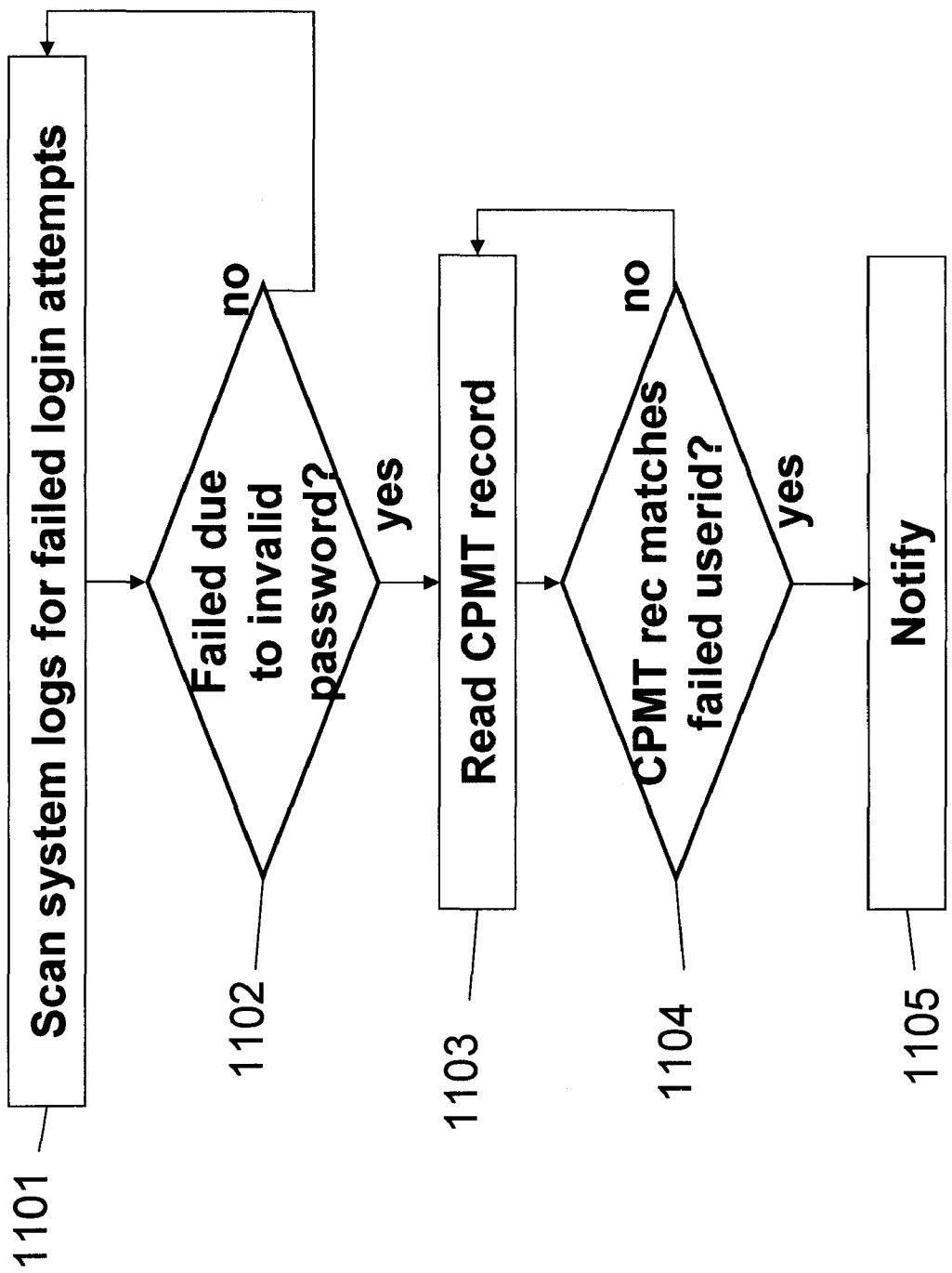
FIG. 11 is a flowchart illustrating steps for monitoring systems logs to encourage proper usage of passwords.

FIG. 11 summarizes one embodiment involved in a program which scans the CPMT and the system logs for the purpose of ensuring consistent usage of a useri's password. In this embodiment, this program is not allowed to be implemented as an integral part of the login process and therefore can be run on a periodical basis (say once a day). In the method outlined in FIG. 11, block 1101 processes the system logs to find instances of failed login attempts due to invalid passwords. When such instances are found, block 1103 reads the CPMT. Block 1104 checks if the userid is maintained in the CPMT, and if so, block 1105 notifies the userid-owner and application-owner which allows for the useri's password and usage to be proactively maintained instead of waiting until the userid gets locked. It could also keep a count of the invalid usage in the userid-invalid-count field which would provide metrics of invalid usage. This would allow system and application support personnel to proactively make decisions for supporting the userid.

To contrast with the present invention, U.S. Pat. Nos. 6,601,173; 6,240,184; 5,682,475; and 6,240,184 (incorporated by reference) refer to password control for multi-system usage by a single authorized user. For instance, U.S. Pat. No. 6,240,184 provides a system, method, and data structure for securely synchronizing passwords used by a single user across multiple systems. However, unlike the present invention, none of these conventional methodologies involve userids being shared across multiple applications.

The inventive method for central management of passwords keeps track of all usages of userid/password. The method automatically synchronizes these usages when passwords change. The method periodically verifies that all usages are consistent. The method provides pre-notification and post-notification. The method also provides usage metrics.

Figure 14:
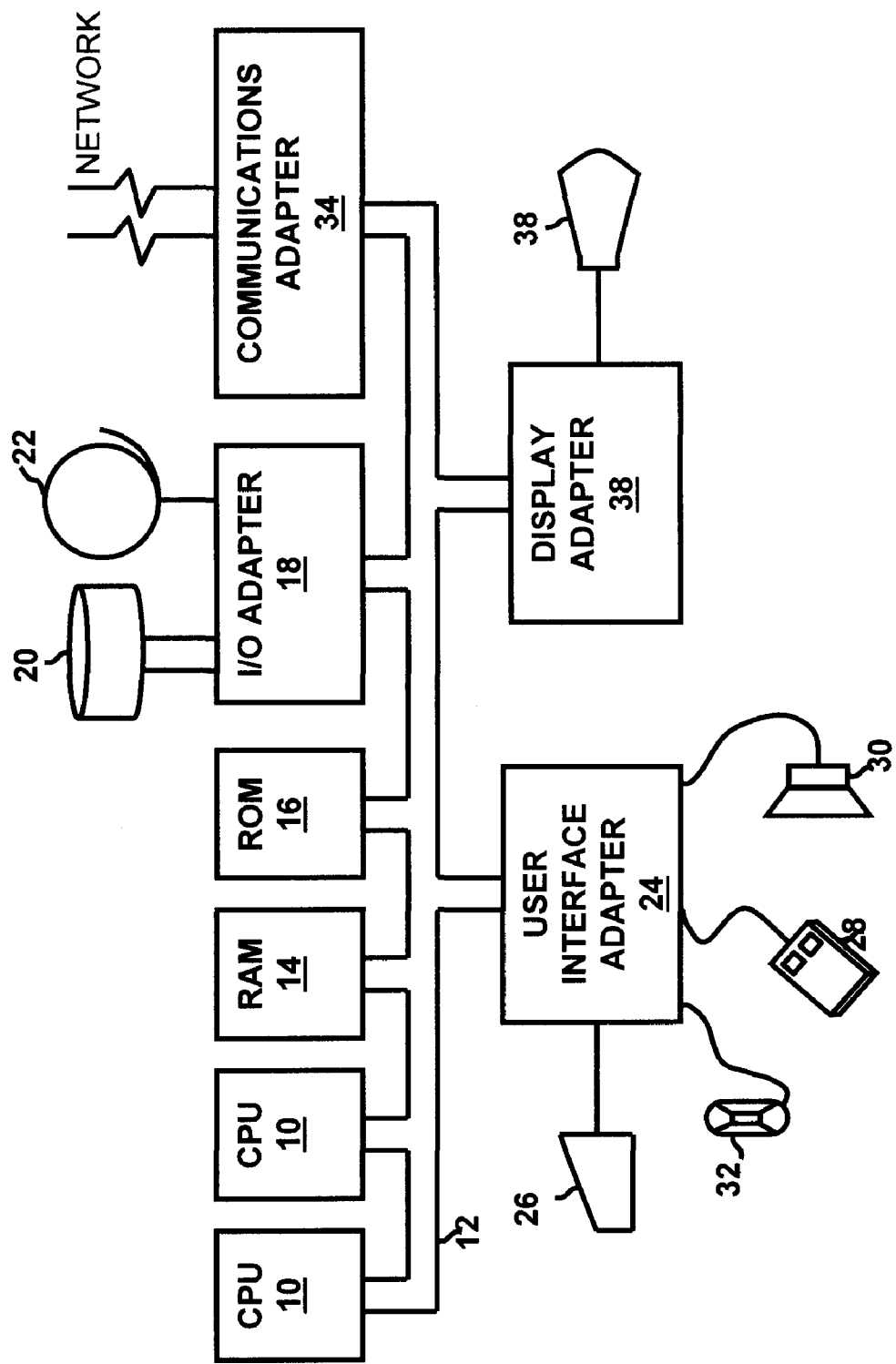
FIG. 14 is a hardware description of the invention.

A representative hardware system and structure for practicing the present invention is depicted in FIG. 14. This schematic drawing illustrates a hardware configuration of an information handling/computer system in accordance with the subject invention. This system includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 20, tape drives 22, or other program storage devices that are readable by the system. The system can read the inventive instructions on the program storage devices and follow these instructions to execute the methodology of the invention. A user interface adapter 24 connects a keyboard 26, mouse 28, speaker 30, microphone 32, and/or other user interface devices to the bus 12 to gather user input. In addition, a communication adapter 34 can connect the information handling system to a data processing network, and a display adapter 36 connects the bus 12 to a display or other similar output device 38.

It should be understood by those of ordinary skill in the art, however, that the present invention is not limited to the above implementation and is independent of the computer/system architecture. Accordingly, the present invention may equally be implemented on other computing platforms, programming languages and operating systems, and also may be hardwired into a circuit or other computational component.

While the invention has been described in terms of the preferred embodiments, those skilled in the art will recognize that the invention can be practiced with modification within the spirit and scope of the appended claims. For instance, while the userid-password mechanism of authentication is discussed above in order to simplify the explanation, those skilled in the art will recognize that the invention is equally applicable to other authentication mechanisms like digital certificates, etc. Furthermore, a Relational Database Management System (RDBMS) is used above as a data repository, though applications to other forms of data repository will be obvious to those skilled in the art.

The invention claimed is:

1. A method of authorizing access to an item, said method comprising:
    receiving a presented password from an entity desiring access to said item;
    comparing said presented password with a stored password;
    authorizing access if said presented password exactly matches said stored password;
    denying access if said presented password fails to exactly match said stored password;
    variably incrementing a lockout count if said presented password fails to exactly match said stored password; and
    locking out access to said item if said lockout count exceeds a predetermined value,
    wherein said variably incrementing process increments said lockout count different amounts depending upon how closely said presented password matches said stored password.

2. The method in claim 1, all the limitations of which are incorporated herein by reference, wherein, in said variably incrementing process, said lockout count is incremented a lesser amount as said presented password matches said stored password more closely and is incremented a greater amount as said presented password matches said stored password less closely.

3. The method in claim 1, all the limitations of which are incorporated herein by reference, further comprising determining how closely said presented password matches said stored password by evaluating whether the difference between said presented password and said stored password relates to typographical errors.

4. The method in claim 1, all the limitations of which are incorporated herein by reference, further comprising determining how closely said presented password matches said stored password by classifying the difference between said presented password and said stored password into different types of password errors.

5. The method in claim 4, all the limitations of which are incorporated herein by reference, wherein said different types of password errors cause said lockout count to be incremented by different values.

6. The method in claim 4, all the limitations of which are incorporated herein by reference, wherein said types of password errors comprise missing characters, extra characters, transposed characters, and incorrect case usage.

7. The method in claim 1, all the limitations of which are incorporated herein by reference, wherein said denying process allows additional passwords to be presented and said locking out process prevents additional passwords from being presented.

8. A method of authorizing access to an item, said method comprising:

receiving a presented password from an entity desiring access to said item;

comparing said presented password with a stored password;

authorizing access if said presented password exactly matches said stored password;

denying access if said presented password fails to exactly match said stored password;

variably incrementing a lockout count if said presented password fails to exactly match said stored password; and locking out access to said item if said lockout count exceeds a predetermined value, wherein said variably incrementing process does not increment said lockout count if said presented password is the same as a previously presented password that was entered within a predetermined previous time period.

9. The method in claim 8, all the limitations of which are incorporated herein by reference, wherein, wherein said variably incrementing process increments said the lockout count different amounts depending upon how closely said presented password matches said stored password, such that said lockout count is incremented a lesser amount as said presented password matches said stored password more closely and is incremented a greater amount as said presented password matches said stored password less closely.

10. The method in claim 9, all the limitations of which are incorporated herein by reference, further comprising determining how closely said presented password matches said stored password by evaluating whether the difference between said presented password and said stored password relates to typographical errors.

11. The method in claim 9, all the limitations of which are incorporated herein by reference, further comprising determining how closely said presented password matches said stored password by classifying the difference between said presented password and said stored password into different types of password errors.

12. The method in claim 11, all the limitations of which are incorporated herein by reference, wherein said different types of password errors cause said lockout count to be incremented by different values.

13. The method in claim 11, all the limitations of which are incorporated herein by reference, wherein said types of password errors comprise missing characters, extra characters, transposed characters, and incorrect case usage.

14. The method in claim 8, all the limitations of which are incorporated herein by reference, wherein said denying process allows additional passwords to be presented and said locking out process prevents additional password from being presented.

15. A program storage device readable by machine, tangibly embodying a program of instructions executable by said machine to perform a method of authorizing access to an item, said method comprising:

receiving a presented password from an entity desiring access to said item;

comparing said presented password with a stored password;

authorizing access if said presented password exactly matches said stored password;

denying access if said presented password fails to exactly match said stored password;

variably incrementing a lockout count if said presented password fails to exactly match said stored password; and locking out access to said item if said lockout count exceeds a predetermined value, wherein said variably incrementing process increments said lockout count different amounts depending upon how closely said presented password matches said stored password.

16. The program storage device in claim 15, all the limitations of which are incorporated herein by reference, wherein, in said variably incrementing process, said lockout count is incremented a lesser amount as said presented password matches said stored password more closely and is incremented a greater amount as said presented password matches said stored password less closely.

17. The program storage device in claim 15, all the limitations of which are incorporated herein by reference, wherein said method further comprises determining how closely said presented password matches said stored password by evaluating whether the difference between said presented password and said stored password relates to typographical errors.

18. The program storage device in claim 15, all the limitations of which are incorporated herein by reference, wherein said method further comprises determining how closely said presented password matches said stored password by classifying the difference between said presented password and said stored password into different types of password errors.

19. The program storage device in claim 18, all the limitations of which are incorporated herein by reference, wherein said different types of password errors cause said lockout count to be incremented by different values.

20. The program storage device in claim 18, all the limitations of which are incorporated herein by reference, wherein said types of password errors comprise missing characters, extra characters, transposed characters, and incorrect case usage.

21. The program storage device in claim 15, all the limitations of which are incorporated herein by reference, wherein said denying process allows additional passwords to be presented and said locking out process prevents additional passwords from being presented.

* * * * *